(12) United States Patent
Takahashi et al.

(10) Patent No.: US 12,040,470 B2
(45) Date of Patent: Jul. 16, 2024

(54) POWER STORAGE CELL AND METHOD OF MANUFACTURING SAME

(71) Applicant: PRIME PLANET ENERGY & SOLUTIONS, INC., Tokyo (JP)

(72) Inventors: Hiroyuki Takahashi, Kasai (JP); Go Yamashiro, Kakogawa (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 183 days.

(21) Appl. No.: 17/484,095

(22) Filed: Sep. 24, 2021

(65) Prior Publication Data
US 2022/0140416 A1 May 5, 2022

(30) Foreign Application Priority Data

Oct. 29, 2020 (JP) ................. 2020-181627

(51) Int. Cl.
*H01M 10/658* (2014.01)
*H01M 10/647* (2014.01)
*H01M 50/209* (2021.01)
*H01G 9/00* (2006.01)
*H01G 9/08* (2006.01)

(52) U.S. Cl.
CPC ....... *H01M 10/658* (2015.04); *H01M 10/647* (2015.04); *H01M 50/209* (2021.01); *H01G 9/0029* (2013.01); *H01G 9/08* (2013.01)

(58) Field of Classification Search
CPC .................................................. H01M 10/658
See application file for complete search history.

(56) References Cited

U.S. PATENT DOCUMENTS

| 2001/0033962 | A1 | 10/2001 | Suzuki |
| 2002/0010998 | A1* | 1/2002 | Komatsu |
| 2010/0028758 | A1* | 2/2010 | Eaves ............... H01M 10/6555 429/50 |
| 2011/0195301 | A1 | 8/2011 | Taniguchi et al. |
| 2013/0034764 | A1* | 2/2013 | Ochi |
| 2015/0179990 | A1* | 6/2015 | Utley |
| 2017/0092901 | A1* | 3/2017 | Yamafuku |
| 2017/0250388 | A1* | 8/2017 | Unno |
| 2019/0312255 | A1* | 10/2019 | Dai ...................... B23K 26/354 |
| 2021/0091428 | A1* | 3/2021 | Naito |

FOREIGN PATENT DOCUMENTS

| CN | 102916144 A | 2/2013 |
| CN | 106575721 A | 4/2017 |
| CN | 107004788 A | 8/2017 |

(Continued)

*Primary Examiner* — Matthew T Martin
*Assistant Examiner* — Krishna R Hammond
(74) *Attorney, Agent, or Firm* — Finnegan, Henderson, Farabow, Garrett & Dunner, LLP (57) ABSTRACT

A power storage cell includes: an exterior container having a top surface, a bottom surface, and a side surface located between the top surface and the bottom surface; and an insulating film that covers at least the side surface of the exterior container. The insulating film has a juncture on the side surface of the exterior container, and the juncture on the side surface is heat-sealed. A heat-sealed portion on the side surface has a termination portion at a position separated from the top surface or the bottom surface of the exterior container.

7 Claims, 12 Drawing Sheets

(56) References Cited

FOREIGN PATENT DOCUMENTS

| JP | 2005-108633 A | 4/2005 |
|----|---------------|--------|
| JP | 2005-116228 A | 4/2005 |
| JP | 2011-181485 A | 9/2011 |
| JP | 2012-209124 A | 10/2012 |
| JP | 2013-33668 A | 2/2013 |
| WO | WO 2014/188774 A1 | 11/2014 |
| WO | WO 2016/035395 A1 | 3/2016 |
| WO | WO 2016-091851 A1 | 6/2016 |
| WO | WO 2019-187313 A1 | 10/2019 |

* cited by examiner

POWER STORAGE CELL AND METHOD OF MANUFACTURING SAME

This nonprovisional application is based on Japanese Patent Application No. 2020-181627 filed on Oct. 29, 2020, with the Japan Patent Office, the entire contents of which are hereby incorporated by reference.

BACKGROUND OF THE INVENTION

Field of the Invention

The present disclosure relates to a power storage cell and a method of manufacturing the power storage cell.

Description of the Background Art

In order to achieve electrical insulation protection, a housing of a power storage cell has been conventionally covered with an insulating film. An exemplary conventional structure is described in Japanese Patent Laying-Open No. 2013-33668 (PTL 1).

When the housing is covered with the insulating film, a juncture is formed at the insulating film. By heat-sealing the juncture, the juncture can be closed to achieve insulation protection. However, when the insulating film is heat-sealed, the insulating film may be contracted to form a hard lump. When other components are designed to avoid interference with the lump, a degree of freedom in design is decreased, with the result that downsizing of an entire module including the power storage cell may be hindered.

SUMMARY OF THE INVENTION

An object of the present disclosure is to provide a power storage cell and a method of manufacturing the power storage cell so as to improve a degree of freedom in designing a peripheral member while achieving insulation protection.

A power storage cell according to the present disclosure includes: an exterior container having a top surface, a bottom surface, and a side surface located between the top surface and the bottom surface; and an insulating film that covers at least the side surface of the exterior container. The insulating film has a juncture on the side surface of the exterior container, and the juncture on the side surface is heat-sealed. A heat-sealed portion on the side surface has a termination portion at a position separated from the top surface or the bottom surface of the exterior container.

A method of manufacturing a power storage cell according to the present disclosure includes: providing an insulating film on at least a side surface of an exterior container having a top surface, a bottom surface, and the side surface, the side surface being located between the top surface and the bottom surface; and heat-sealing a juncture of the insulating film on the side surface. The heat-sealing includes dissipating heat from a second region of the side surface while heat-sealing a first region of the side surface, the second region being located in a vicinity of the top surface or the bottom surface of the exterior container.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present disclosure will be described. It should be noted that the same or corresponding portions are denoted by the same reference characters and may not be described repeatedly.

It should be noted that in the embodiments described below, when reference is made to number, amount, and the like, the scope of the present disclosure is not necessarily limited to the number, amount, and the like unless otherwise stated particularly. Further, in the embodiments described below, each component is not necessarily essential to the present disclosure unless otherwise stated particularly.

Figure 1:
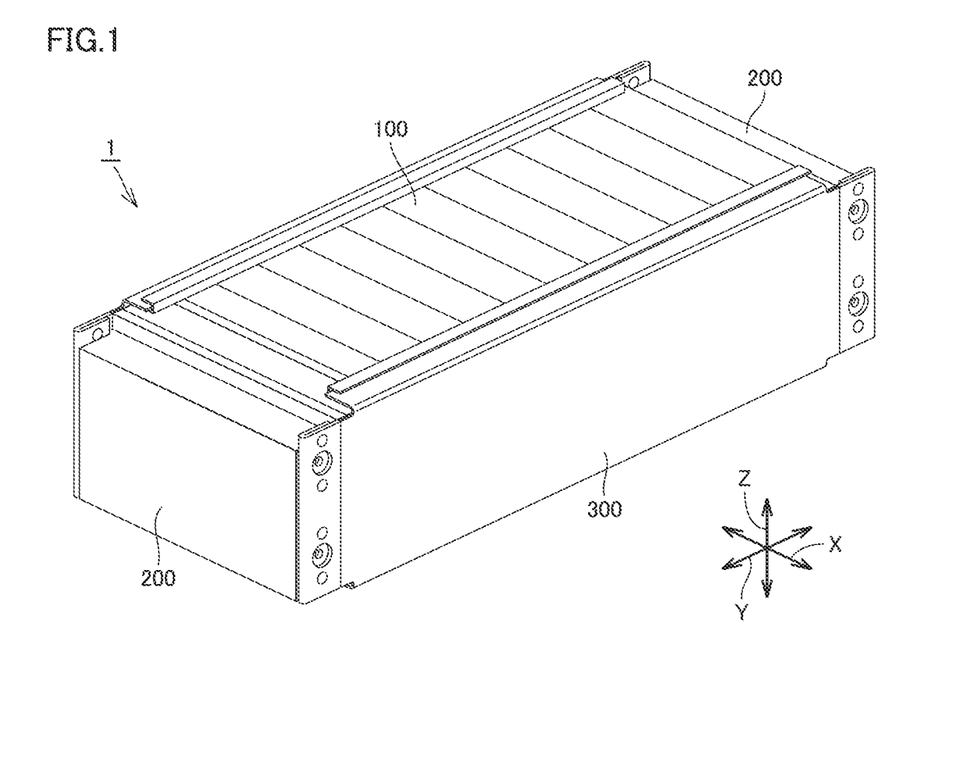
FIG. 1 is a diagram showing a basic configuration of a battery pack.
Figure 2:
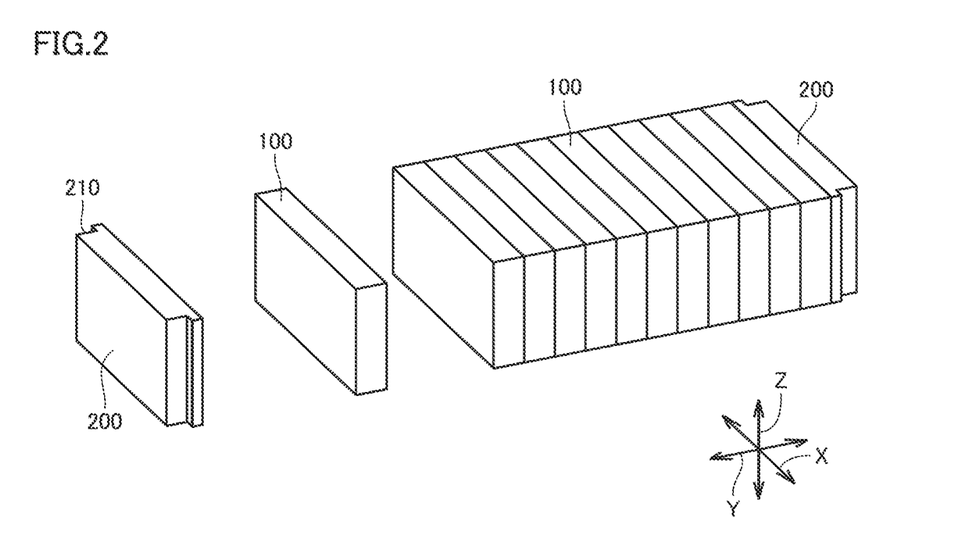
FIG. 2 is a diagram showing battery cells and end plates in the battery pack shown in FIG. 1.

FIG. 1 is a diagram showing a basic configuration of a battery pack 1. FIG. 2 is a diagram showing battery cells 100 and end plates 200 included in battery pack 1.

As shown in FIGS. 1 and 2, battery pack 1 serving as an exemplary "power storage module" includes battery cells 100, end plates 200, and a restraining member 300.

As an example, battery cell 100 is a lithium ion battery, but battery cell 100 may be another battery such as a nickel-metal hydride battery. Further, in the present disclosure, the "power storage module" is not limited to battery pack 1, and a capacitor may be used as a "power storage cell" instead of battery cell 100, for example.

The plurality of battery cells 100 are provided side by side in a Y axis direction (arrangement direction). Each of battery cells 100 includes an electrode terminal 110. A separator (not shown) is interposed between the plurality of battery cells 100. The plurality of battery cells 100 sandwiched between two end plates 200 are pressed by end plates 200, and are restrained between two end plates 200.

End plates 200 are disposed at both ends of battery pack 1 in the Y axis direction (arrangement direction). End plates 200 are fixed to a base such as a case that accommodates battery pack 1.

Restraining member 300 connects two end plates 200 to each other. Restraining member 300 is attached to two end plates 200.

Restraining member 300 is engaged with end plates 200 with compression force in the Y axis direction being applied to a stack of the plurality of battery cells 100 and end plates 200, and then the compression force is released, thereby exerting tensile force on restraining member 300 that connects two end plates 200 to each other. As a counteraction, restraining member 300 presses two end plates 200 in a direction of bringing them closer to each other.

Figure 3:
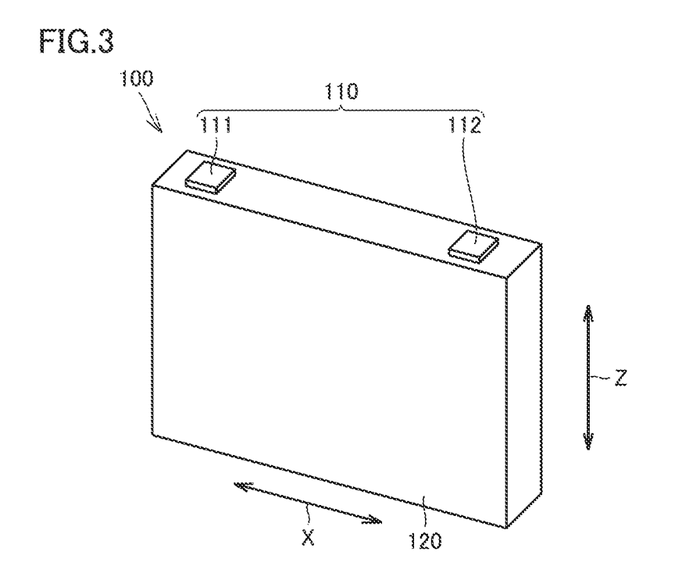
FIG. 3 is a diagram showing each battery cell in the battery pack shown in FIG. 1.

FIG. 3 is a diagram showing each battery cell 100 in battery pack 1. As shown in FIG. 3, battery cell 100 is formed to have a flat rectangular parallelepiped shape. Electrode terminal 110 includes a positive electrode terminal 111 and a negative electrode terminal 112. Electrode terminal 110 is formed on a housing 120 having a prismatic shape. An electrode assembly (not shown) and an electrolyte solution (not shown) are accommodated in housing 120.

Figure 4:
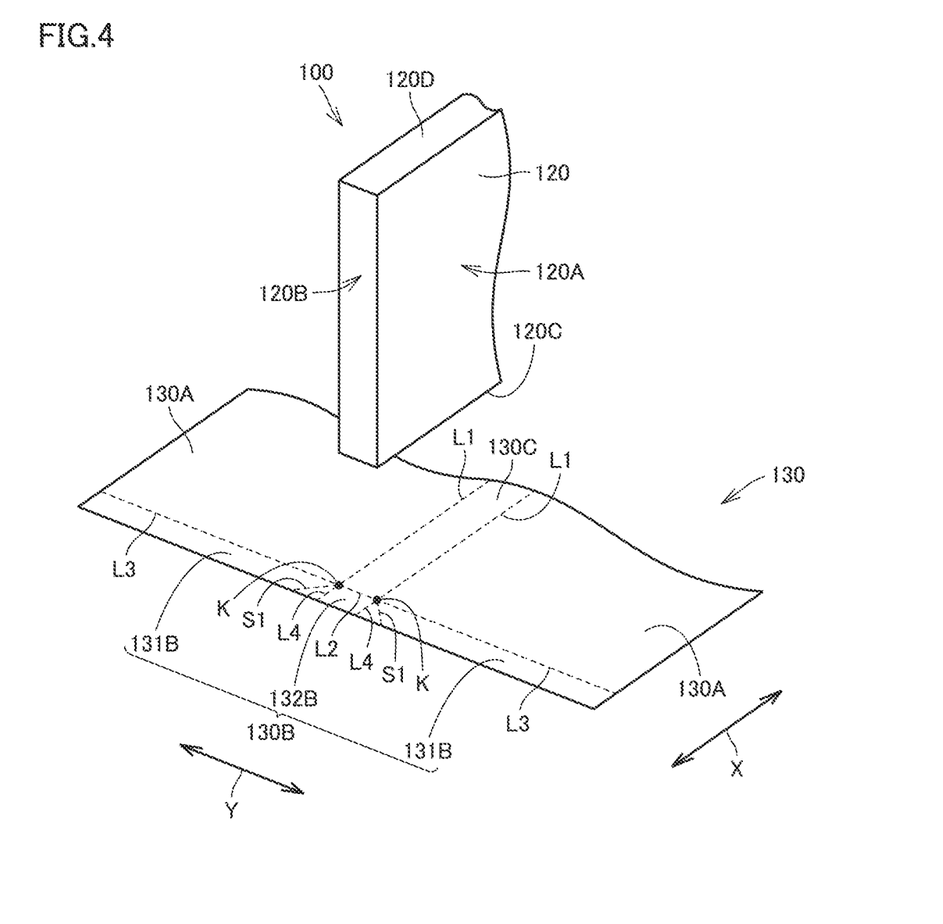
FIG. 4 is a diagram showing an exemplary shape of an insulating film.

FIG. 4 is a diagram showing an exemplary shape of an insulating film 130. In order to achieve electrical insulation protection, housing 120 of battery cell 100 is covered with insulating film 130. The insulating film is composed of an insulating material such as polyethylene terephthalate (PET).

As shown in FIG. 4, housing 120 (exterior container) has side surfaces 120A (long side surfaces), side surfaces 120B (short side surfaces), a bottom surface 120C, and a top surface 120D. Side surfaces 120A, 120B are located between bottom surface 120C and top surface 120D.

Insulating film 130 covers side surfaces 120A, 120B and bottom surface 120C of housing 120. As shown in FIGS. 5 to 8, side surfaces 120A, 120B and bottom surface 120C of housing 120 are covered by folding insulating film 130 that is in the form of a sheet. A portion of insulating film 130 may extend onto top surface 120D of housing 120, or may not reach top surface 120D.

Insulating film 130 includes: side surface covering portions 130A that cover side surfaces 120A of housing 120; side surface covering portions 130B that cover side surfaces 120B of housing 120; and a bottom surface covering portion 130C that covers bottom surface 120C of housing 120. In insulating film 130, bottom surface covering portion 130C is provided between the pair of side surface covering portions 130A, and side surface covering portions 130B protrudes from side surface covering portions 130A and bottom surface covering portion 130C. Each of side surface covering portions 130B includes: first portions 131B protruding outward from the respective side edges of side surface covering portions 130A; and a second portion 132B protruding outward from the side edge of bottom surface covering portion 130C.

As shown in FIG. 4, each first portion 131B and second portion 132B of side surface covering portion 130B are not separated from each other at a boundary therebetween and are continuous to each other. Therefore, in a state in which insulating film 130 is folded along housing 120, no pinhole is formed at each intersection K.

Each of FIGS. 5 to 8 is a diagram showing a step of covering housing 120 of battery cell 100 with insulating film 130. As shown in FIGS. 5 to 8, side surfaces 120A, 120B and bottom surface 120C of housing 120 are covered by folding insulating film 130 that is in the form of a sheet.

Figure 5:
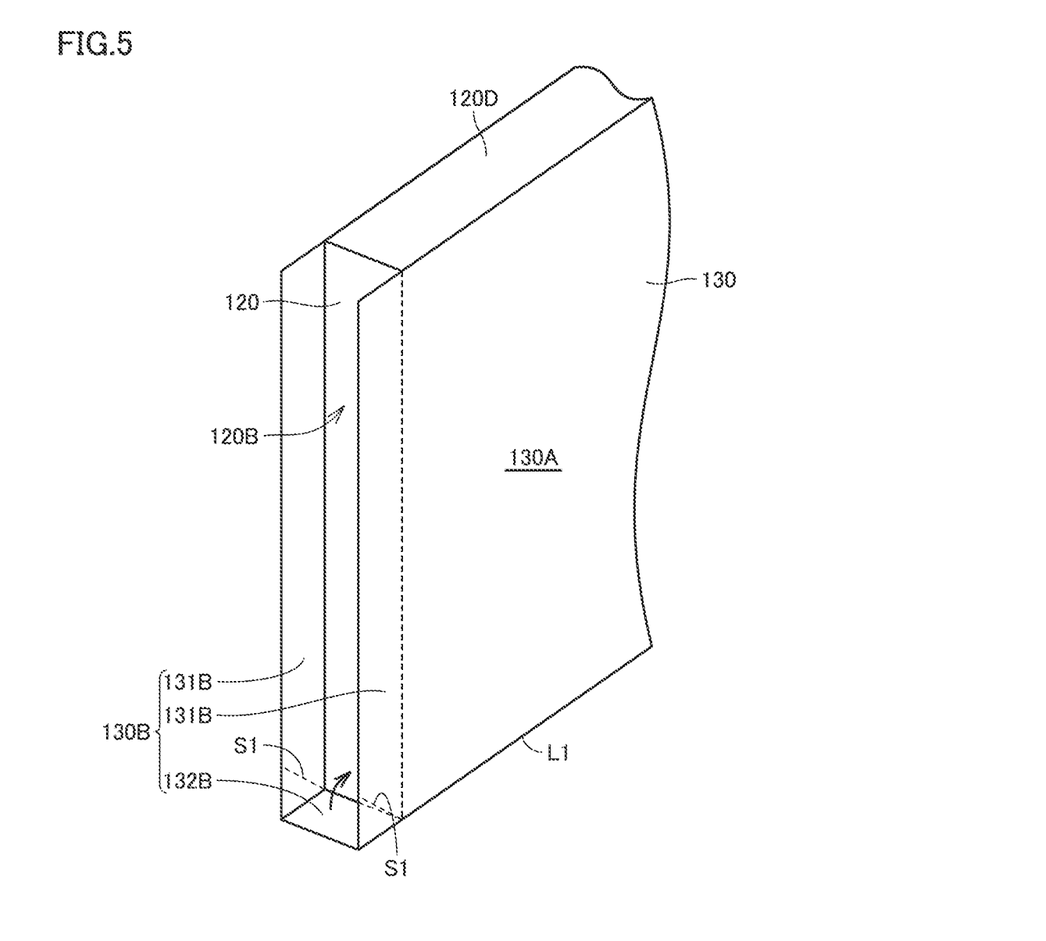
FIG. 5 is a first diagram showing a step of covering a housing of the battery cell with the insulating film shown in FIG. 4.
Figure 6:
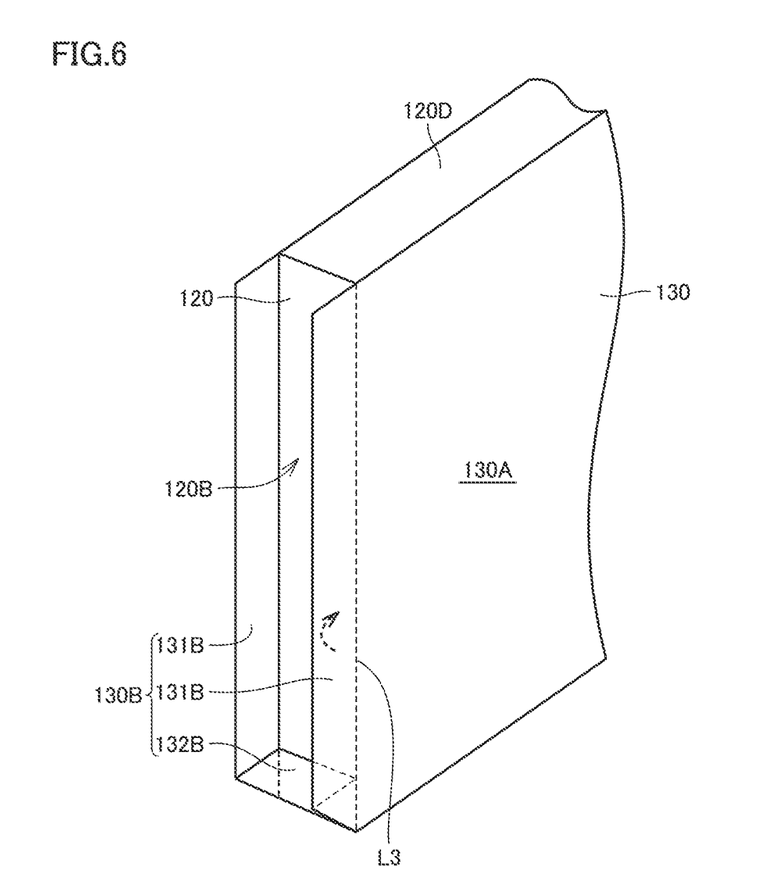
FIG. 6 is a second diagram showing the step of covering the housing of the battery cell with the insulating film shown in FIG. 4.
Figure 7:
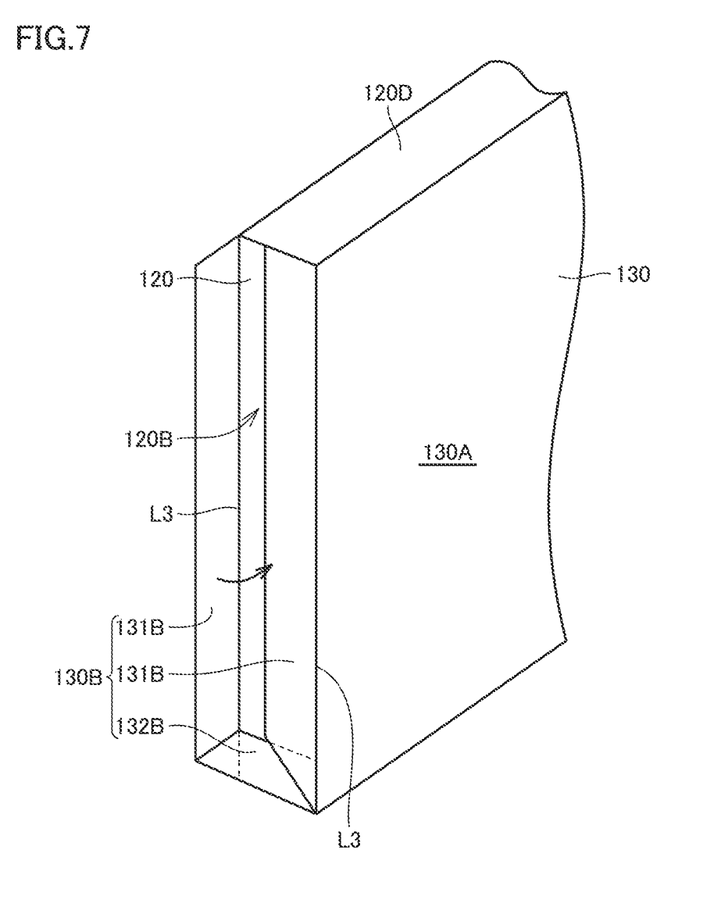
FIG. 7 is a third diagram showing the step of covering the housing of the battery cell with the insulating film shown in FIG. 4.

Specifically, insulating film 130 is folded inward at a boundary line L1 between each side surface covering portion 130A and bottom surface covering portion 130C, thereby covering bottom surface 120C of housing 120 with bottom surface covering portion 130C and thereby covering side surface 120A of housing 120 with side surface covering portion 130A (FIG. 5). Further, insulating film 130 is folded inward at a boundary line L2 between each second portion 132B and bottom surface covering portion 130C, and insulating film 130 is folded inward at a boundary line L3 between each first portion 131B and each side surface covering portion 130A. In the vicinity of a link portion between first portion 131B and second portion 132B, insulating film 130 is folded at a boundary line L4 between first portion 131B and second portion 132B and at a folding line S1 on first portion 131B, with the result that first portion 131B and second portion 132B are layered on side surface 120B of housing 120 (FIGS. 6 and 7).

Figure 8:
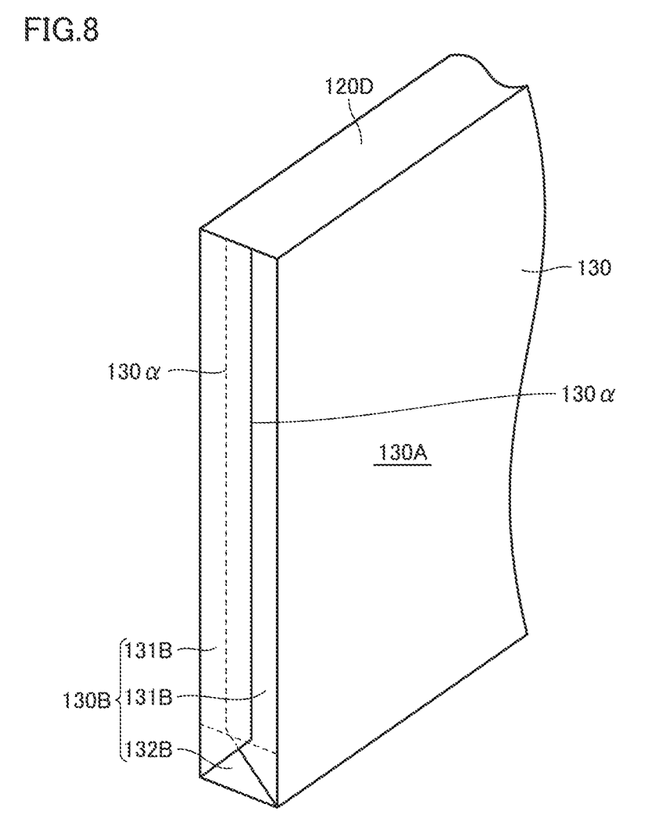
FIG. 8 is a fourth diagram showing the step of covering the housing of the battery cell with the insulating film shown in FIG. 4.

The layered portion of first portion 131B and second portion 132B on side surface 120B is heated and welded (heat-sealed) to have a watertight structure. That is, junctures 130α of the layered portion shown in FIG. 8 are closed by heat-sealing insulating film 130. Thus, entire side surface 120B of housing 120 is covered with insulating film 130, thereby securing electrical insulation protection.

Figure 9:
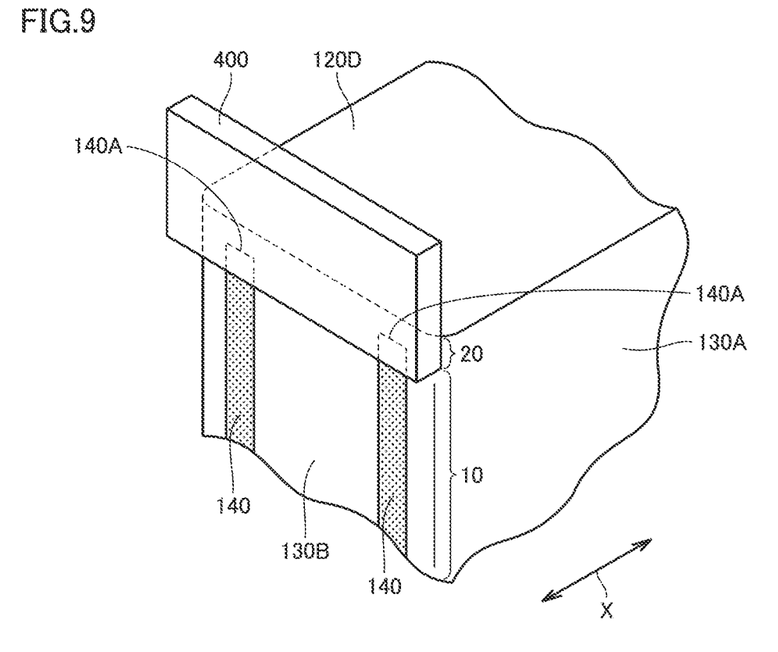
FIG. 9 is a diagram showing a shape of each of heat-sealed portions of the insulating film.

FIG. 9 is a diagram showing a shape of each of heat-sealed portions 140 of insulating film 130 (overlapped portions of insulating film 130 welded by the heat-sealing).

As shown in FIG. 9, each of heat-sealed portions 140 is formed to extend in a height direction (Z axis direction) from bottom surface 120C toward top surface 120D along juncture 130α of insulating film 130. The plurality of heat-sealed portions 140 (two heat-sealed portions 140 in the example of FIG. 9) or only one heat-sealed portion 140 may be formed to extend along the Z axis direction.

Each of heat-sealed portions 140 is terminated at a position (termination portion 140A) separated from top surface 120D of housing 120. Also on the bottom surface 120C side, heat-sealed portion 140 may be terminated at a position separated from bottom surface 120C of housing 120. That is, side surface covering portion 130B of insulating film 130 includes: a first region 10 that is heat-sealed; and a second region 20 that is not heat-sealed. Second region 20 is not heat-sealed but can secure insulation protection comparable to insulation protection secured by first region 10.

Thus, since second region 20 that is not heat-sealed is provided in the vicinity of top surface 120D of housing 120, a lump of insulating film 130 contracted by the heat-sealing can be suppressed from being formed in the vicinity of top surface 120D of housing 120 to interfere with a peripheral member such as a bus bar module, and a degree of freedom in designing the peripheral member can be suppressed from being decreased to avoid the interference.

When heat-sealing side surface covering portion 130B, heat is dissipated by bringing a jig 400 for promoting heat dissipation into contact with second region 20 located in the vicinity of top surface 120D while heat-sealing first region 10 located on the center side in the Z axis direction by bringing a heat plate (welding plate) into contact with first region 10. By promoting heat dissipation in the vicinity of top surface 120D by bringing jig 400 into abutment therewith, a lump of insulating film 130 contracted by the heat-sealing can be suppressed from being formed to interfere with the peripheral member, and the degree of freedom in designing the peripheral member can be suppressed from being decreased to avoid the interference.

Figure 10:
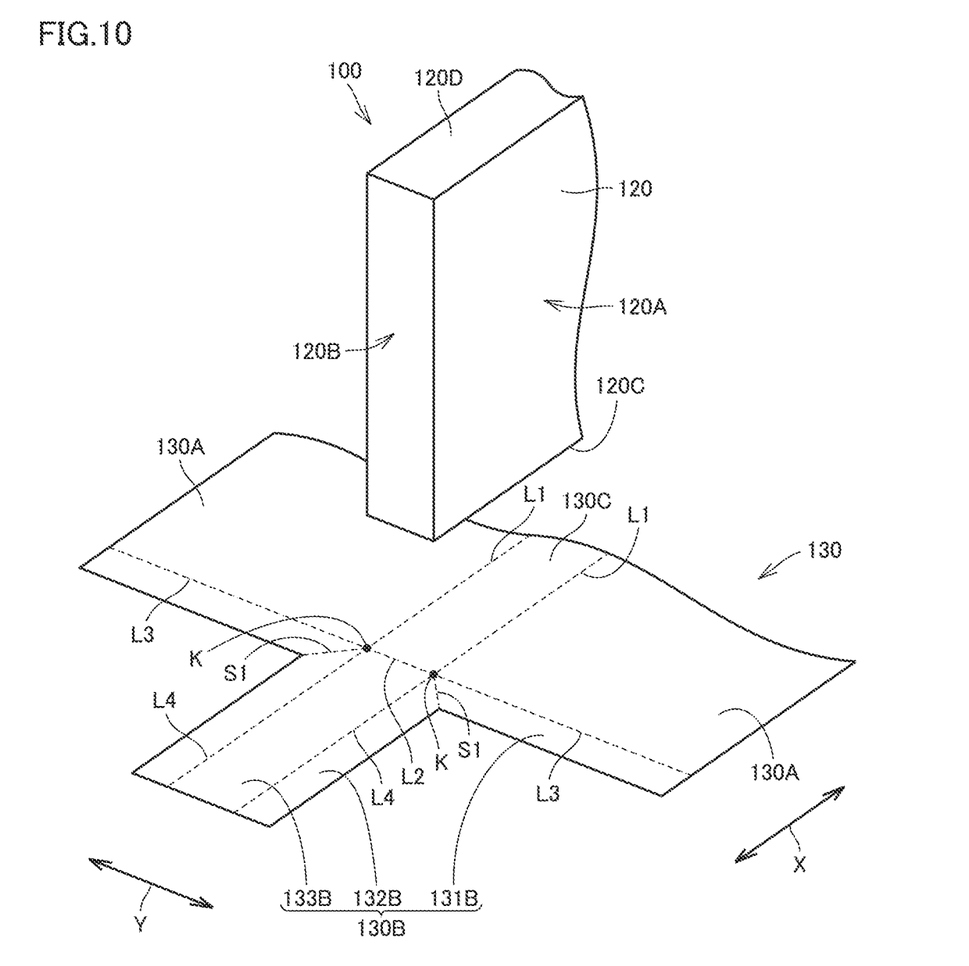
FIG. 10 is a diagram showing a modification of the shape of the insulating film.
Figure 11:
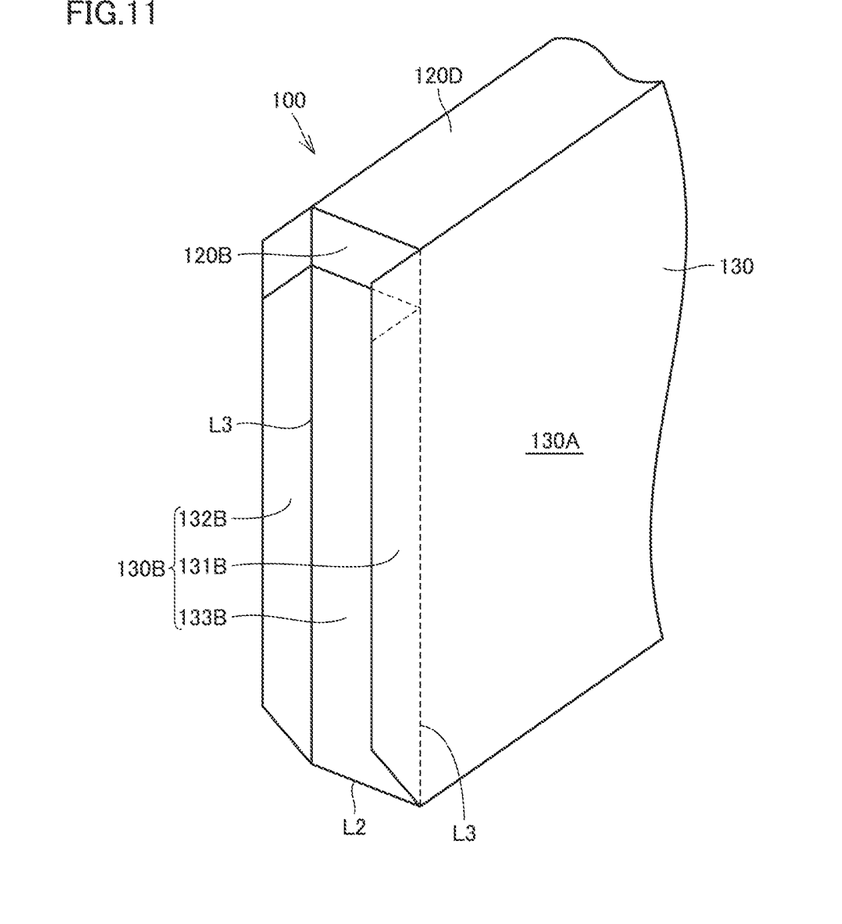
FIG. 11 is a diagram showing a step of covering the housing of the battery cell with the insulating film shown in FIG. 10.

FIG. 10 is a diagram showing a modification of the shape of insulating film 130. FIG. 11 is a diagram showing a step of covering housing 120 of battery cell 100 with insulating film 130 shown in FIG. 10.

In the modification shown in FIGS. 10 and 11, each of side surface covering portions 130B of insulating film 130 includes first portions 131B, second portions 132B, and a third portion 133B. First portions 131A and second portions 132B protrude from the respective side edges of side surface covering portions 130A. Third portion 133B protrudes from the side edge of bottom surface covering portion 130C.

As shown in FIGS. 10 and 11, side surfaces 120A of housing 120 are covered with side surface covering portions 130A, side surfaces 120B are covered with side surface covering portions 130B, and bottom surface 120C is covered with bottom surface covering portion 130C. On each side surface 120B, first portions 131B, second portions 132B, and third portion 133B of side surface covering portion 130B are layered and this layered portion is welded (heat-sealed) to close the junctures.

The width of each first portion 131B of side surface covering portion 130B in the X axis direction and the width of each second portion 132B of side surface covering portion 130B in the Y axis direction are equal to each other in a state in which insulating film 130 is unfolded, insulating film 130 is folded at folding line S1 in the boundary portion therebetween, and first portion 131B and second portion 132B are layered on each other. On the other hand, in the state in which insulating film 130 is unfolded, the lengths of each second portion 132B and third portion 133B in the X axis direction are shorter than the length of first portion 131B in the Y axis direction. Therefore, when insulating film 130 is folded as shown in FIG. 11, first portion 131B of side surface covering portion 130B reaches the boundary between side surface 120B and top surface 120D of housing 120, whereas second portion 132B and third portion 133B do not reach top surface 120D.

When providing insulating film 130 on housing 120, insulating film 130 is folded inward at boundary line L1 between side surface covering portion 130A and bottom surface covering portion 130C with bottom surface 120C of housing 120 facing bottom surface covering portion 130C of the insulating film as shown in FIG. 10. Thus, side surface 120A of housing 120 is covered with side surface covering portion 130A, and bottom surface 120C of housing 120 is covered with bottom surface covering portion 130C.

Next, insulating film 130 is folded inward at boundary line L2 between third portion 133B of side surface covering portion 130B and bottom surface covering portion 130C. Thus, side surface 120B of housing 120 is covered with third portion 133B of side surface covering portion 130B.

Further, insulating film 130 is folded inward at folding line S1 that is a boundary line between first portion 131B and second portion 132B of side surface covering portion 130B, with the result that first portion 131B and second portion 132B of side surface covering portion 130B are layered on each other.

From the state shown in FIG. 11, first portion 131B and second portion 132B of side surface covering portion 130B are folded inward at boundary line L3 with side surface covering portion 130A, with the result that first portion 131B and second portion 132B layered on each other are folded to be on the surface of third portion 133B. The layered portion of first portion 131B, second portion 132B, and third portion 133B is heated and is welded (heat-sealed) to have a water-tight structure.

According to the modification shown in FIGS. 10 and 11, since side surface covering portion 130B of insulating film 130 has the three-layer structure of first portion 131B, second portion 132B, and third portion 133B, stronger insulation protection can be secured. On the other hand, since the lengths of second portion 132B and third portion 133B are shorter than that of first portion 131B and only first portion 131B extends to the vicinity of top surface 120D of housing 120, a lump of insulating film 130 contracted by the heat-sealing can be suppressed from being formed in the vicinity of top surface 120D to interfere with the peripheral member, and the degree of freedom in designing the peripheral member can be suppressed from being decreased to avoid the interference.

Figure 12:
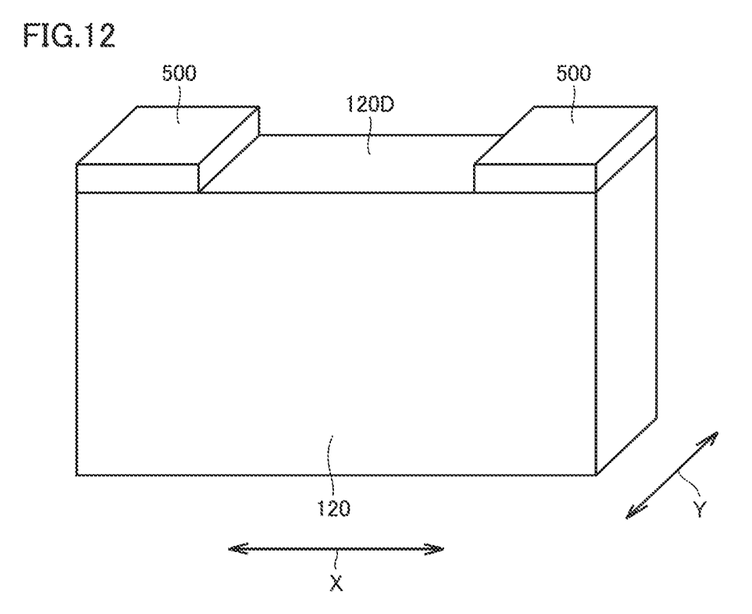
FIG. 12 is a diagram showing exemplary jigs used in a heat-sealing step.

FIG. 12 is a diagram showing jigs 500 used in the heat-sealing step. As shown in FIG. 12, jigs 500 are provided at both end portions of top surface 120D of housing 120 in the X axis direction, and jigs 500 can prevent those portions from being exposed to warm air in the step of heat-sealing insulating film 130. Thus, a lump of insulating film 130 contacted can be suppressed from being formed at a shoulder portion of housing 120 to interfere with the peripheral member, and the degree of freedom in designing the peripheral member can be suppressed from being decreased to avoid the interference.

Figure 13:
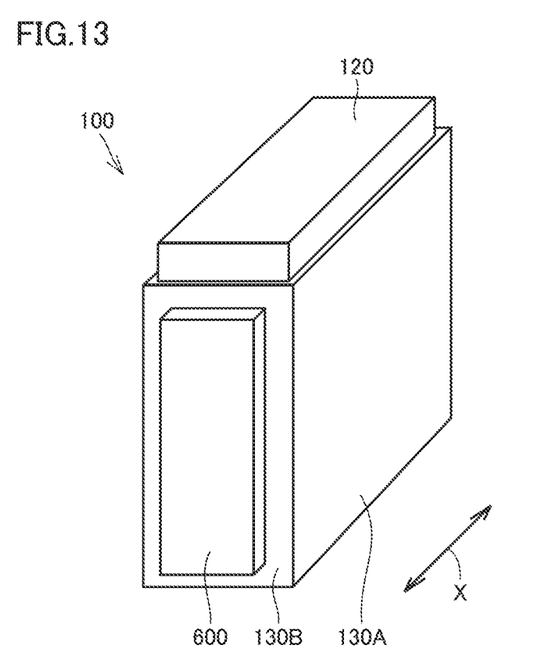
FIG. 13 is a diagram showing a battery cell according to a modification.

FIG. 13 is a diagram showing a battery cell 100 according to a modification. In the modification shown in FIG. 13, a member 600 is provided on side surface covering portion 130B of insulating film 130. Member 600 is constituted of a separate component such as a separator. Insulating film 130 is provided on housing 120 so as to be terminated slightly below top surface 120D of housing 120. Member 600 presses side surface covering portion 130B of insulating film 130 to suppress occurrence of further detachment of insulating film 130 when secondary contraction of insulating film 130 occurs due to a use environment.

Figure 14:
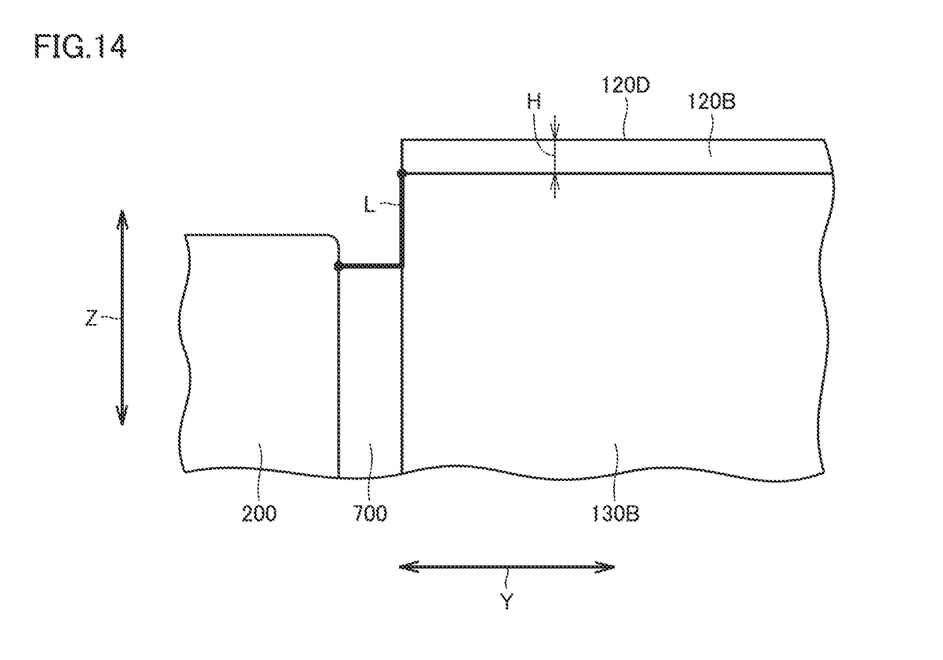
FIG. 14 is a diagram showing a structure of an upper corner portion of a battery cell located at an end portion in a stacking direction.

FIG. 14 is a diagram showing a structure of an upper corner portion of battery cell 100 located at an end portion in the stacking direction (Y axis direction). As shown in FIG. 14, a separator 700 is provided between battery cell 100 at the end portion and end plate 200. End plate 200 is composed of a conductor such as aluminum or cast iron. Separator 700 is composed of an insulating material such as a resin, a rubber, or an elastomer.

As shown in FIG. 14, insulating film 130 is provided to be terminated at a position lower than top surface 120D of housing 120 by a predetermined height H (for example, about 0.5 mm). It is necessary to secure a predetermined creepage distance L (for example, about 7 mm) from the upper end of insulating film 130 to end plate 200. Therefore, it is necessary to suppress detachment of insulating film 130.

According to battery cell 100 of the present embodiment, since a lump of insulating film 130 thermally contracted can be suppressed from being formed at the shoulder portion of housing 120 as described above, the degree of freedom in designing the peripheral member around battery cell 100 can be improved while achieving insulation protection.

In the present embodiment, it has been illustratively described that heat-sealed portion 140 is provided on side surface 120B; however, the position at which heat-sealed portion 140 is formed is not limited to side surface 120B. Also, in the present embodiment, it has been illustratively described that housing 120 having a prismatic shape is covered with insulating film 130; however, housing 120 of battery cell 100 may have a cylindrical shape.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power storage cell comprising:
   an exterior container having a prismatic shape including a top surface, a bottom surface, a long side surface, and a short side surface, the long side surface and the short side surface being located between the top surface and the bottom surface; and
   an insulating film that covers at least the short side surface of the exterior container, wherein
   the insulating film covering the short side surface has a first portion and a second portion that at least partially overlap each other to form a layered portion of the insulating film extending along the short side surface, the layered portion having a juncture on the short side surface of the exterior container formed at an edge of the layered portion, and the juncture on the short side surface is closed by heating and welding the layered portion of the insulating film in a first region of the short side surface closer to the center of the exterior container than a second region of the short side surface to form a heat-sealed portion extending in a height direction between the bottom surface and the top surface along the juncture and not heat-sealing the layered portion in the second region of the short side surface, which is closer to at least one of the bottom surface or the top surface than the first region of the short side surface.

2. The power storage cell according to claim 1, wherein a plurality of heat-sealed portions on the side surface are formed to extend along a direction from the bottom surface toward the top surface.

3. The power storage cell according to claim 1, wherein the insulating film extends onto the top surface of the exterior container.

4. A power storage cell comprising:
   an exterior container having a prismatic shape including a top surface, a bottom surface, a long side surface and a short side surface, the long side surface and the short side surface being located between the top surface and the bottom surface; and
   an insulating film that covers at least the short side surface of the exterior container, wherein
   the insulating film covering the short side surface has a first portion and a second portion which at least partially overlap each other to form a layered portion of the insulating film extending along the short side surface, the layered portion having a juncture on the short side surface of the exterior container, the juncture is formed at an edge of the layered portion, and the juncture is closed by heating and welding the layered portion of the insulating film in a first region of the short side surface closer to the center of the exterior container than a second region of the short side surface to form a heat-sealed portion extending in a height direction between the bottom surface and the top surface along the juncture and not heat-sealing the layered portion in the second region of the short side surface that is closer to at least one of the bottom surface or the top surface than the first region of the short side surface.

5. The power storage cell according to claim 4, wherein a plurality of heat-sealed portions on the side surface are formed to extend along a direction from the bottom surface toward the top surface.

6. The power storage cell according to claim 4, wherein the insulating film extends onto the top surface of the exterior container.

7. A method of manufacturing a power storage cell, the method comprising:
   providing an insulating film on at least a short side surface of an exterior container having a prismatic shape including a top surface, a bottom surface, a long side surface and the short side surface, the long side surface and the short side surface being located between the top surface and the bottom surface; and
   heat-sealing a juncture of the insulating film on the short side surface, wherein the insulating film has a first portion and a second portion which at least partially overlap each other to form a layered portion of the insulating film, and the juncture is formed at an edge of the layered portion, and the juncture is closed by heating and welding the layered portion of the insulating film in a first region of the short side surface closer to the center of the exterior container than a second region of the short side surface to form a heat sealed portion extending in a height direction between the bottom surface and the top surface along the juncture and not heat-sealing the layered portion in the second region of the short side surface that is closer to at least one of the bottom surface or the top surface than the first region of the short side surface by dissipating heat from the second region of the short side surface.

* * * * *